United States Patent
Higgins et al.

(10) Patent No.: US 8,148,161 B2
(45) Date of Patent: Apr. 3, 2012

(54) SELECTIVE MEMBRANES/THIN FILMS FOR ANALYTICAL APPLICATIONS

(75) Inventors: Bernadette A. Higgins, Alexandria, VA (US); Duane L. Simonson, Brandywine, MD (US); Viet Nguyen, Gaithersburg, MD (US); Jennifer L. Stepnowski, Alexandria, VA (US); R Andrew McGill, Lorton, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 270 days.

(21) Appl. No.: 12/434,107

(22) Filed: May 1, 2009

(65) Prior Publication Data

US 2009/0301169 A1  Dec. 10, 2009

Related U.S. Application Data

(60) Provisional application No. 61/049,799, filed on May 2, 2008.

(51) Int. Cl.
G01N 33/00 (2006.01)

(52) U.S. Cl. ........ 436/104; 422/68.1; 422/83; 427/2.11; 528/10

(58) Field of Classification Search .................. 436/104; 427/2.11; 528/10; 422/68.1, 83, 58
See application file for complete search history.

(56) References Cited

U.S. PATENT DOCUMENTS

| | | |
|---|---|---|
| 3,951,815 A | 4/1976 | Wrasidlo |
| 4,033,731 A | 7/1977 | Bargain et al. |
| 4,093,515 A | 6/1978 | Kolobow |
| 4,262,041 A | 4/1981 | Eguchi et al. |
| 4,851,124 A | 7/1989 | Vandegrift et al. |
| 5,024,594 A | 6/1991 | Athayde et al. |
| 5,087,513 A | 2/1992 | Kim |
| 5,391,426 A | 2/1995 | Wu |
| 6,630,560 B2 | 10/2003 | McGill et al. |
| 6,660,230 B2 | 12/2003 | McGill et al. |
| 6,824,689 B2 | 11/2004 | Aardahl et al. |
| 7,026,403 B2 | 4/2006 | Dharmarajan et al. |
| 7,078,548 B2 | 7/2006 | Houser et al. |
| 7,153,582 B2 | 12/2006 | Houser et al. |
| 7,241,989 B2 | 7/2007 | Miller et al. |
| 7,344,585 B1 | 3/2008 | Kulprathipanja et al. |
| 7,459,121 B2 | 12/2008 | Liang et al. |

(Continued)

FOREIGN PATENT DOCUMENTS

WO  2004/041428  5/2004

(Continued)

OTHER PUBLICATIONS

McGill et al., The design of functionalized silicone polymers for chemical sensor detection of nitroaromatic compounds, Sensors and Actuators B, 65: 5-9 (2000).*

(Continued)

Primary Examiner — Jill Warden
Assistant Examiner — Monique Cole
(74) Attorney, Agent, or Firm — Amy L. Ressing; Joseph T. Grunkemeyer

(57) ABSTRACT

Disclosed herein is a composition having: a polymer having a carbosilane or siloxane backbone and pendant hydrogen-bond acidic groups; and a filler material having polar groups. The polymer is not covalently bound to the filler material.

26 Claims, 10 Drawing Sheets

U.S. PATENT DOCUMENTS

| | | | |
|---|---|---|---|
| 7,749,767 B2 * | 7/2010 | Lebret et al. | 436/107 |
| 2002/0026026 A1 * | 2/2002 | McGill et al. | 528/10 |
| 2002/0045272 A1 | 4/2002 | McDevitt et al. | |
| 2003/0168355 A1 | 9/2003 | Houser et al. | |
| 2004/0058057 A1 * | 3/2004 | Houser et al. | 427/2.11 |
| 2005/0186378 A1 | 8/2005 | Bhatt | |
| 2005/0287418 A1 | 12/2005 | Noh et al. | |
| 2006/0191320 A1 * | 8/2006 | Pinnaduwage et al. | 73/24.06 |
| 2006/0243658 A1 | 11/2006 | Zubov et al. | |
| 2007/0003440 A1 * | 1/2007 | McGill et al. | 422/82.13 |
| 2007/0099068 A1 | 5/2007 | Suzuki et al. | |
| 2007/0106050 A1 | 5/2007 | Sokolowski et al. | |
| 2007/0148476 A1 | 6/2007 | Khanarian et al. | |
| 2007/0184121 A1 | 8/2007 | Sung | |
| 2008/0006574 A1 | 1/2008 | Ramaswamy et al. | |
| 2008/0114149 A1 | 5/2008 | Moore et al. | |
| 2008/0141858 A1 | 6/2008 | Liu et al. | |
| 2008/0154029 A1 | 6/2008 | Balayan et al. | |

FOREIGN PATENT DOCUMENTS

| | | |
|---|---|---|
| WO | 2006044712 A1 | 4/2006 |
| WO | 2007/101051 | 9/2007 |

OTHER PUBLICATIONS

Higgins et al., "Functionalized Sorbent Membranes for Use with Ion Mobility Spectrometry (SMIMS)" IEEE Conference on Technologies for Homeland Security (May 12, 2008).

Whitemarsh et al., Synthesis and Structure of a Highly Branched Polycarbosllane Derived from (Chloromethyl) trichiorosilane Organometallics 1991, 10, 1336-1344.

PCT Search Report and Written Opinion in PCT/US09/42512.

* cited by examiner

SELECTIVE MEMBRANES/THIN FILMS FOR ANALYTICAL APPLICATIONS

This application claims the benefit of U.S. Provisional Application No. 61/049,799, filed on May 2, 2008. The provisional application and all other publications and patent documents referred to throughout this nonprovisional application are incorporated herein by reference.

TECHNICAL FIELD

The present disclosure is generally related to preconcentrator membranes.

DESCRIPTION OF RELATED ART

Most detection technologies are challenged by issues of sensitivity and/or selectivity for analytes of interest. A system may have the sensitivity needed to detect specific chemicals of interest but suffer from high false alarm rates or it may have the specificity needed but not the sensitivity to detect less volatile compounds. Ion mobility spectroscopy (IMS), gas chromatography (GC), and mass spectrometry (MS) have gained wide acceptance as useful techniques for the detection of a wide range of hazardous chemicals such as explosives, narcotics, and chemical warfare agents. Commercial analytical detectors offer high sensitivity to a large catalog of analytes. However, there are still chemicals of interest that cannot be readily detected at the levels desired. In recent years, one focus has been to optimize chemical detection technologies through improved sampling methods such as preconcentration, membrane introduction, and solid phase microextraction (SPME).

Many commercial analytical detectors currently utilize a membrane usually consisting of a chemically non-specific polymer such as polydimethylsiloxane (PDMS) or polyvinylidene fluoride (PVDF) (Ewing et al., "A critical review of ion mobility spectrometry for the detection of explosives and explosive related compounds" *Talanta* 54 (2001) 515-529; Hyötyläinen et al., "Sorbent- and liquid-phase microextraction techniques and membrane-assisted extraction in combination with gas chromatographic analysis: A review" *Anal. Chim. Acta* 614 (2008) 27-37; Salva et al., "Fiber introduction mass spectrometry: determination of pesticides in herbal infusions using a novel sol-gel PDMS/PVA fiber for solid phase microextraction" *J. Mass Spec.* 42 (2007) 1358-1362; Kotiaho et al., "Membrane inlet ion mobility spectrometry for on-line measurement of ethanol in beer and in yeast fermentation" *Anal. Chim. Acta.* 309 (1995) 317-325). The analytical membranes are designed to allow through or trap analytes but protect the reaction region and drift tube/column from dust, reduce the ambient intrusion of water, and maintain constant pressure conditions (Ewing).

Membrane introduction mass spectrometry (MIMS) (Kotiaho; Thompson et al., "A coaxially heated membrane introduction mass spectrometry interface for the rapid and sensitive on-line measurement of volatile and semi-volatile organic contaminants in air and water at parts-per-trillion levels" *Rapid Commun. Mass Spec.* 20 (2006) 2000-2008; Barri et al., "Advances and developments in membrane extraction for gas chromatography techniques and applications" *J. Chrom. A* 1186 (2008) 16-38; Frandsen et al., "Fast and direct screening of polyaromatic hydrocarbons contaminated sand using miniature membrane inlet mass spectrometer (MIMS)" *Rapid Comm. Mass Spec.* 21 (2007) 1574-1578) temporarily traps volatile and semi-volatile organic compounds in a membrane and then releases collected analytes to the MS after heating (Liu et al., "A new thermal desorption solid-phase microextraction system for hand-held ion mobility spectrometry" *Anal. Chem. Acta* 559 (2006) 159-165). MIMS is uses exclusively with MS systems and example membranes used include PDMS (Liu), polypropylene for organic moieties (Frandsen), or PDMS oxidized with ozone to selectively target analytes of interest (Liu). The physical form of the membranes can include a hollow fiber, ultra thin, membrane bag, or flat sheet (Liu, Creba et al., "An Enzyme Derivatized Polydimethylsiloxane (PDMS) Membrane for Use in Membrane Introduction Mass Spectrometry (MIMS)" *J. Am. Soc. Mass Spectrom.* 18 (2007) 973-979) which are porous or nonporous. In this research flat nonporous membranes were used which require diffusion of the solute in, out, or through the membrane (Hyötyläinen; Liu; Nayar et al., "High speed laser activated membrane introduction mass spectrometric evaluation of bulk methylcyclohexane dehydrogenation catalysts" *Appl. Surf. Sci.* 223 (2004) 118-123).

Ion mobility spectrometry (IMS) is an important technique that employs analyte ionization methods and their time of flight through a drift tube to determine what analyte is present. IMS signals can be enhanced using sorbent polymers to concentrate the vapors before directing them into the detector. Sorbent polymers offer the ability to trap and concentrate a variety of hazardous analytes including toxic industrial chemicals, chemical agents, and explosives. The heated inlet of an IMS typically includes a membrane (usually PDMS or PVDF) which is designed to allow the passage of analytes, but limit the transfer of water and dust beyond the membrane, and help to maintain the pressure inside the IMS. Membrane inlet ion mobility spectrometry has also used a polypropylene membrane to determine the amount of ethanol generated by yeast in beer fermentation (Kotiaho; Thompson).

For IMS systems, a SPME preconcentrator/collection device has been tested with an IMS. This work utilized PDMS coated SPME fibers which when heated in an inlet improved the observed analyte signal (Arce et al., "Sample-introduction systems coupled to ion-mobility spectrometry equipment for determining compounds present in gaseous, liquid and solid samples" *TrAC* 27 (2008) 139-150; Liu et al., "Preliminary studies of using preheated carrier gas for on-line membrane extraction of semivolatile organic compounds, *Anal. Bioanal. Chem.* 387 (2007) 2517-2525). Permeable PDMS tubing attached to the sampling front end of an IMS for has been used for detection of chemicals associated with cigarette smoke (Liu et al., "A new thermal desorption solid-phase microextraction system for hand-held ion mobility spectrometry" *Anal. Chem. Acta* 559 (2006) 159-165).

SPME experiments with specific polymers include the work with the functional hydrogen bond acidic (HBA) polymer HCSFA2 coated on ATR crystals to analyze DMMP sorption with FTIR spectroscopy (Bryant et al., "Chemical Agent Identification by Field-Based Attenuated Total Reflectance Infrared Detection and Solid-Phase Microextraction" *Anal. Chem.* 79 (2007) 2334-2340; Sridaramurthy et al., "Microfluidic chemical/biological sensing based on membrane dissolution and optical absorption" *Meas. Sci. Tech.* 18 (2007) 201-207). The results show promise but the lack of mechanical stability of HCSFA2 at high temperatures means that other steps will need to be taken to prevent failure of the sorbent polymer.

BRIEF SUMMARY

Disclosed herein is a composition comprising: a polymer comprising a carbosilane or siloxane backbone and pendant hydrogen-bond acidic pendant groups; and a filler material comprising polar groups. The polymer is not covalently bound to the filler material.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The present disclosure may provide sorbent membranes with hydrogen-bond acidic properties for use with the inlet of analytical instruments such as ion mobility spectrometers and mass spectrometers. Typical membranes in IMS systems are PDMS based and do not target polar analytes. Hydrogen-bond acidic functionalized membranes are able to concentrate many hazardous analytes before proceeding to the detector. The initial membranes made with sorbent polymers including HCSFA2 and fluorinated bisphenol (BPF) polymers incorporating various amounts of oxidized carbon nanofibers (CNFox) (0-25 wt %) to maintain the physical properties of the polymers during heating to desorb the analyte after analyte collection.

A range of sorbent polymers have been developed for sensor, chromatographic and preconcentrator applications (Houser et al., "Rational materials design of sorbent coatings for explosives: applications with chemical sensors" Talanta 54 (2001) 469-485; Grate "Hydrogen-bond acidic polymers for chemical vapor sensing" Chem. Rev. 108 (2008) 726-745; Higgins et al. "Functionalized sorbent membranes for use with ion mobility spectrometry" 2008 IEEE conference on technologies for homeland security Vol 1 and 2 Waltham, Mass. May 12-13, 2008, (2008) 139-143; U.S. Pat. Nos. 6,630,560; 7,153,582; 7,078,548; 6,660,230). One focus of this research has been designing, synthesizing and using hydrogen bond acid (HBA) sorbent polymers for the sorption of hazardous hydrogen bond basic (HBB) analytes. HBA sorbent polymers have been developed to trap and concentrate a variety of HBB analytes including chemical agents, explosives and toxic industrial chemicals. Sorbent materials with high thermal stabilities for use with applications that demand rapid thermal cycling.

Disclosed herein is a method of enhancing analytical application signals by replacing the PDMS membrane with an HBA functionalized sorbent polymer membrane. Specifically, a strong HBA sorbent polymer (HCSFA2) with functional hexafluoroisopropanol (HFIP) groups was synthesized and used to reversibly sorb HBB analytes (e.g. dimethylmethyl phosphonate (DMMP), or GB, and VX nerve agents).

HCSFA2 (Hyperbranched Carbo Silane bis-(FluroAlcohol) with 2 allyl groups) has the formula: R'$_3$Si—(CH$_2$—SiR$_2$)$_n$—CH$_2$—SiR'$_3$. Each R' is —CH=CH—CH$_2$—C(CF$_3$)$_2$OH, and each R is R' or:

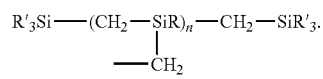

Figure 1:
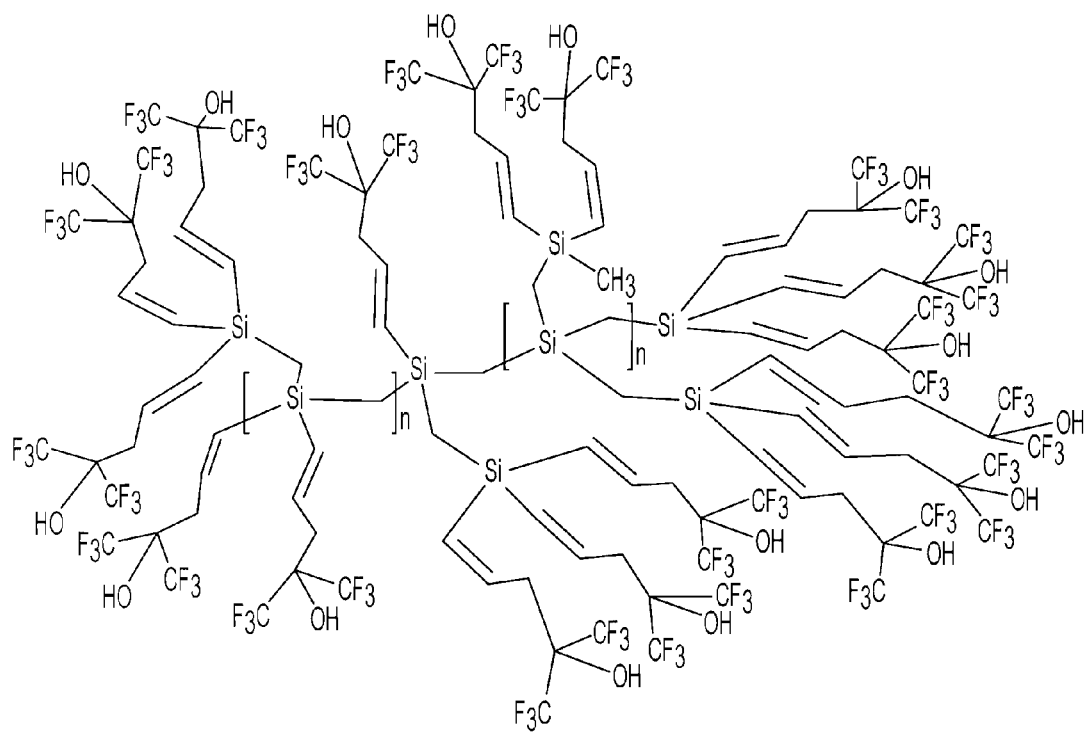
FIG. 1 shows hyperbranched architecture of HCSFA2.

The value n is a positive integer. The recursive nature of this structure can make it a hyperbranched polymer. An example hyperbranched structure is shown in FIG. 1. A linear structure where each R is R' is shown below.

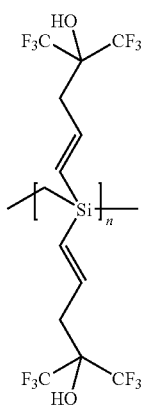

In the HFIP, the highly electronegative fluorine atoms cause the hydrogen atom to be a HBA, capable of forming hydrogen bonds with HBBs. The electron-withdrawing is strong enough that the oxygen atom has little to no HBB property. Compared with crosslinked sorbent polymers, this polymer membrane may be advantageous in that the polymer is adhered physically on the CNFox surface so there were only physical interactions, not chemical covalent ones. The number of steps and purification in the synthesis of CNFox/HCSFA2 are less than the crosslinked sorbent polymers. The viscosity and properties of the polymer are similar to the bulk polymer. The membranes in use now with IMS systems (PDMS and PVDF) have relatively little sorption of DMMP and other analytes of interest.

HCSFA2 exhibits a high thermal stability (270° C.) but low viscosity above 50-100° C. which means that over time a HCSFA2 polymer membrane can flow causing it to fail and contaminate the inlet. To mitigate the flow problems of HCSFA2, the polymer was combined with various amounts of oxidized carbon nanofibers, fumed silica, graphene oxide, or other fillers to maintain the structure of the polymer membrane over time. CNFox has the advantage of offering low cost compared to carbon nanotubes, and CNFox provides a large surface area and is able to mechanically and thermally reinforce the composite.

Figure 2:
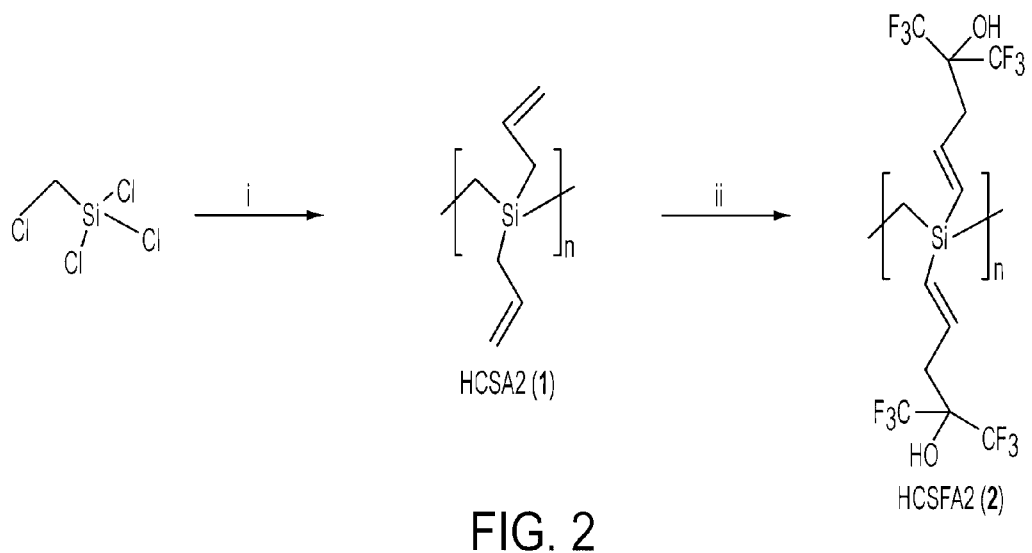
FIG. 2 shows synthesis of HCSFA2: (i): 1. Mg°, SiCl$_4$, THF, 0-25° C. (HCSA2), 24 h; 2. THF, allyl magnesium bromide, 25° C., 24 h. (ii): 1. CHCl$_3$, hexafluoroacetone; 2. 60° C. 24 h.

Synthesis of the precursor HCSA2 (1) polymers used a Grignard reaction at low (0° C. to ambient) temperature (FIG. 2) (Frey et al. *Dendrimers II* 2000, 210, 69-129). The synthesis used a chlorosilane ($ClCH_2SiCl_3$) polymerization reaction using $Mg^°$ (Whitemarsh et al. *Organometallics*, 1991, 10 1336-1344; March, Advanced Organic Chemistry: Reactions, Mechanisms, and Structure. $4^{th}$ Ed. John Wiley and Sons: New York, 1992, 794 & 968; Urry et al. *J. Org. Chem.* 1968, 33, 2302-2310; Interrante et al. Appl. Organomet. Chem. 1998, 12, 695-705). The resulting parent polymer may then be functionalized with hexafluoroacetone (HFA). The HFA functionalization mechanism is a modified ene synthesis. The double bond of HCSA2 (1) electrophilically attacks the ketone of the HFA. The bonds are formed via a pericyclic mechanism which requires formation of a six membered ring (March).

The polymer synthesis was adapted from procedures developed by Interrante and Urry (Whitemarsh et al., *Organometallics*, 1991, 10, 1336-1344; Urry et al., *J. Org. Chem.*, 1968, 33, 2302-2310; Interrante et al., *Appl. Organomet. Chem.*, 1998, 12, 695-705). The HCSFA2 polymers were developed after observations that oxygen in the siloxane or ether linked polymer backbones may interact with HBA moieties in the polymer. The reaction can be allowed to proceed for 24 h and the polymer then reacted with allyl magnesium bromide. After synthesis of the HCSA2 parent, the resulting allyl-pendant polymer may be cloudy due to the presence of residual salt. After drying in air for 12 h the polymer may be redissolved in diethyl ether and the insoluble salts then centrifuged out and the transparent solution filtered through celite. The reaction temperature may be controlled to at or below room temperature until after the HFA reaction is completed. Once the reaction with HFA is complete, the polymer may be heated to elevated temperatures.

Individual HCSA2 batches have relatively similar properties including the color of the resulting parent polymers (light yellow) and viscosity (honey-like). Another useful physical parameter to monitor is the parent and functionalized polymer viscosity. A marked increase in viscosity was observed after functionalization with an initial viscosity for HCSA2 being water like (approximately 5-10 cP) and after HFA functionalization (HCSFA2), viscosity of approximately $3.2 \times 10^6$ cP (at 25° C.) was observed. The desired viscosity is dictated by the application of the polymer, with some requiring low or high viscosity.

In the design of these HBA polymers several desirable physicochemical properties were considered. These include a glass transition temperature ($T_g$) at or below the anticipated application temperature, reversible sorption of analyte, thermal and chemical stability at operating conditions, functionalizability to target analytes of interest and availability of those functional sites for interactions with target analyte molecules. In addition to using carbosilane polymers in this synthesis, the architecture of the carbosilane polymer backbone was modified to produce certain physical properties of the resulting polymer. A trifunctional chlorosilane monomer was used to synthesize a polymer with a hyperbranched architecture. Hyperbranched polymers may offer the advantage of increasing the exposure of their peripheral functional groups, decreased viscosity at ambient temperature, and ease of synthesis compared with dendritic polymers. Hyperbranched polymers may be advantageous over linear polymers for sorption applications due to difficulty of analyte transport to and from the center of linear polymers because of the typical random coil structure.

Other suitable polymers include, but are not limited to, those disclosed in U.S. Pat. Nos. 6,630,560; 7,153,582; 7,078,548; and 6,660,230.

The filler material contains polar groups that can facilitate chemical interaction with the polymer in the absence of covalent bonds. This may produce a more homogenous mixture of polymer and filler, such that substantially all the polymer is supported by the filler and maintains its structural integrity at elevated temperatures. Suitable fillers include, but are not limited to, a nanostructured carbonaceous material, oxidized carbon nanofibers, fumed silica, graphene oxide, and titanium dioxide. The filler may be nanostructured to increase the contact between polymer and filler. Suitable compositions may include, but are not limited to, those with no more than about 25 wt % of the filler.

The polymer and filler may be combined in any manner that produces a substantially homogenous mixture. The composition may then be formed into a film. The film may be useful for sorbing HBB analytes. The analytes may then be released from the film by a heater configured to heat the film. Thus the film acts as a preconcentrator for the analyte.

In one embodiment, the film may be in the form of a mesh-supported membrane in which the sampled fluid may pass through the membrane, while the analyte is absorbed. In another embodiment, the film may be on a flat substrate over which the sample flows, as in a modified CASPAR preconcentrator (microfabricated hotplate) (US Patent Application Publication Nos. 2005/0226778 and 2005/0095722; U.S. Provisional Patent Application No. 60/477,032; Pai et al., "Towards Enhanced Detection of Chemical Agents: Design and Development of a Microfabricated Preconcentrator" Transducers & Eurosensors '07: The 14th International Conference on Solid-State Sensors, Actuators and Microsystems, 2291-2294 (Lyon, France, Jun. 10-14, 2007); Martin et al., "Microfabricated vapor preconcentrator for portable ion mobility spectroscopy" *Sensors and Actuators B*, 126, 447-454 (2007)). In another embodiment, the film is coated on a fiber as used for SPME.

The film may be used by exposing the film to a fluid sample suspected of containing an analyte, heating the film to produce an analyte vapor, and performing an assay on the analyte vapor. Suitable assays include, but are not limited to, ion spectroscopy and gas chromatography. The fluid sample may be gaseous or may be liquid. When a liquid sample is used, the film may also be removed from the liquid sample to allow removal of liquid on the surface of the film, such as by agitating the film to shake off excess liquid or by wiping with a suitable adsorbent material.

A variety of analytes, including HBB compounds, may be sorbed by the composition for subsequent analysis. Suitable analytes include, but are not limited to, explosives, narcotics, and chemical agents, including nerve agents, blister agents, blood agents, and lachrymating agents. Analytes may also include toxic industrial chemicals (TICs) e.g. ammonia, acetone cyanohydrin, allyl isothiocyanate, arsine, acrolein, arsenic trichloride, boron trichloride, acrylonitrile, bromine, boron trifluoride, allyl alcohol, bromine chloride, carbon disulfide, allylamine, bromine pentafluoride, chlorine, allyl chlorocarbonate, bromine trifluoride, diborane, boron tribromide, carbonyl fluoride, ethylene oxide, carbon monoxide, chlorine pentafluoride, fluorine, carbonyl sulfide, chlorine trifluoride, formaldehyde, chloroacetone, chloroacetaldehyde, hydrogen bromide, chloroacetonitrile, chloroacetyl chloride, hydrogen chloride, chlorosulfonic acid, crotonaldehyde, hydrogen cyanide, diketone, cyanogen chloride, hydrogen fluoride, 1,2-dimethylhydrazine, dimethyl sulfate, hydrogen sulfide, ethylene dibromide, diphenylmethane-4,4'-diisocyanate, nitric acid (fuming), hydrogen selenide, ethyl chloroformate, phosgene, methanesulfonyl chloride, ethyl chlorothioformate, phosphorus trichloride, methyl bromide, ethyl phosphonothioic dichloride, sulfur dioxide, methyl chloroformate, ethyl phosphonic dichloride, sulfuric acid, methyl chlorosilane, ethyleneimine, tungsten hexafluoride, methyl hydrazine, hexachlorocyclopentadiene, methyl isocyanate, hydrogen iodide, methyl mercaptan, iron pentacarbonyl, nitrogen dioxide, isobutyl chloroformate, phosphine, isopropyl isocyanate, phosphorus oxychloride, n-butyl chloroformate, phosphorus pentafluoride, n-butyl isocyanate, selenium hexafluoride, nitric oxide, silicon tetrafluoride, n-propyl chloroformate, stibine, parathion, sulfur trioxide, perchloromethyl mercaptan, sulfuryl fluoride, sec-butyl chloroformate, tellurium hexafluoride, tert-butyl isocyanate, n-octyl mercaptan, tetraethyl lead, titanium tetrachloride, tetraethyl pyrophosphate, trichloroacetyl chloride, tetramethyl lead, trifluoroacetyl chloride, toluene 2,4-diisocyanate, and toluene 2,6-diisocyanate.

The following examples are given to illustrate specific applications. These specific examples are not intended to limit the scope of the disclosure in this application.

EXAMPLE 1

Synthesis of HCSFA2—Materials: $Mg^o$, $SiCl_4$, $CHCl_3$ (99+%), diethyl ether (99+%), 1-butanol (99+%), THF (99.8%), acetone (99%), $NH_4Cl$, allyl magnesium bromide 1 M in diethyl ether, Celite®, and hexafluoroacetone (HFA, 98%) were from Aldrich Chemical Co., and $ClCH_2SiCl_3$ was from Gelest. THF (Aldrich Chemical Co., HPLC grade) was distilled from $Na^o$ and benzophenone ketyl under nitrogen. Silanized glass wool and presilanized 30 cm by 3 mm i.d. glass columns were purchased from Surface Measurement Systems (SMS) Ltd. iGC probe vapors—undecane, decane, nonane, octane, heptane, acetone, methanol, 2-propanol, acetonitrile, and $CHCl_3$ were all anhydrous from Aldrich Chemical Co. iGC carrier gases used were ultra high purity grade from Airgas Inc.

Characterization: $^1H$ and $^{13}C$ NMR spectra were collected with a 300 MHz Bruker ATS. FTIR spectra were collected with a Digilab FTS 7000e using KBr salt plates and a liquid $N_2$ cooled MCT detector.

Synthesis of HCSA2 (1): $Mg^o$ (5 g, 208 mmol) was stirred in a 500 mL round bottomed flask and dried overnight under reduced pressure. 0.1 mL (0.149 g, 0.9 mmol) $SiCl_4$ and 15 mL (22.0 g, 120 mmol) of $ClCH_2SiCl_3$ were added all at once at room temperature and the reaction temperature maintained at or slightly below room temperature using an ice/water bath for 8 h. (Caution! This reaction can generate significant heat and requires monitoring). Freshly distilled THF (1-5 mL) was added as required to adjust for viscosity and allow stirring. The reaction mixture was then stirred overnight at room temperature without the water bath. After 12-24 h the reaction was cooled to 0° C., THF was added, and 250 mL 1 M allyl magnesium bromide in diethyl ether (250 mmol) was added in 20 mL increments over 3 h. The reaction mixture was stirred at room temperature for 24 hours.

Finally, the reaction was quenched with 0° C. $NH_4Cl$ (sat aq). The aqueous layer was rinsed twice with THF followed by hexane and the organic layer was filtered through a packed bed of Celite® filter agent. The solvent was removed by rotary evaporation and the resulting HCSA2 polymer was re-extracted into ether, centrifuged and dried at RT under vacuum. The temperature of the parent polymer was maintained close to room temperature to avoid undesirable crosslinking. (12 g, 55% yield) FTIR (KBr): 3077, 2950, 1630, 1253, 794. $^1H$ NMR (300 MHz $CDCl_3$, δ): 0.07 (b, 2H, Si—$CH_2$), 1.68 (dd, 4H, 2Si—$CH_2$—), 4.92 (m, 4H, 2$CH_2$=), 5.80 (q, 2H, 2—CH=). $^{13}C$ NMR (300 MHz, $CDCl_3$, δ): −6 to 0.48 (Si—$CH_2$), 20-25 (Si—$CH_2$—), 113 (—CH=), 134 ($CH_2$=). TGA 5% WLT=121° C.

Synthesis of HCSFA2 (2): The parent polymer (HCSA2 (1)) (6 g, 40 mmol) was weighed into a stainless steel reactor and 20 mL of $CHCl_3$ was added. The reaction vessel was sealed with a valve and evacuated briefly. A gas cylinder of HFA was attached with Swagelok™ fittings to the reactor. The vessel was cooled with liquid $N_2$ and a portion of HFA added (20 g, 120 mmol) to the parent polymer solution and the HFA cylinder was removed. After removal from liquid $N_2$ the reactor was allowed to warm to room temperature and then moved to a magnetically stirred oil bath heated at 60° C. for 24 h.

The reaction was cooled to room temperature and excess HFA was recovered under vacuum. The reactor was opened and rinsed three times with $CHCl_3$ to remove the polymer. The polymer solution was filtered through Celite®. The Celite® was washed three times with $CHCl_3$ and the volatiles were removed. The functionalized polymer was extracted into diethyl ether and subsequently dried under reduced pressure with heating. Theoretical yield=22.6 g (assuming 2 HFA units per monomer), actual=19.2 g (85%) with 10% of original allyl groups remaining (by $^1H$ NMR). Found: C, 35.4%; H, 3.1%; F, 47.1%; requires ($C_{13}H_{12}O_2F_{12}Si$ repeat unit) C, 34.3%; H, 2.2%; F, 50.2%. FTIR (KBr): 3700, 3500, 3300, 2933, 1609, 1213, 1147, 1040, 700. $^1H$ NMR (300 MHz, $CDCl_3$, δ): 0.31 (m, 2H, Si—$CH_2$), 2.80 (b, 4H, 2—CH—$CH_2$—C), 3.24 (b, 1H, OH), 5.05 (b, 0.5H, $CH_2$=CH— (unreacted)), 5.97 (b, 2H, 2Si—CH=CH), 6.50 (b, 2H, 2CH=CH—$CH_2$). $^{13}C$ NMR (300 MHz, $CDCl_3$, δ): 0 ($CH_2$), 33.7 ($CH_2$), 75-76 (C($CF_3$)$_2$—OH), 117-128 (—$CF_3$), 133 (—CH=), 140 (—CH=). TGA 5% WLT=185° C.

EXAMPLE 2

Synthesis of CNFox filled HCSFA2—1 g of HCSFA2 was weighed into 100 mL vial and dissolved in THF. 20 wt % of CNFox (oxidized by ASI) were weighed into the vial, and the polymer/CNFox solution was sonicated for 1-5 min. The composite solution was stirred vigorously for 30 min then solvent was removed via vacuum overnight with stirring. The resulting composite was a highly viscous black sticky solid.

EXAMPLE 3

Synthesis of fumed silica filled HCSFA2—1 g of HCSFA2 was weighed into a 20 mL vial with 0.10 g fumed silica (silicic anhydride, Aldrich). The solution was stirred at high rate of speed for 1.5 h. The solution was then opened to the atmosphere to allow evaporation of the solvent. Once low enough the remainder of the solvent was removed via vacuum. The resulting composite was a sticky yellow/white translucent solid that was moldable upon handling and/or heating.

EXAMPLE 4

Synthesis of graphene oxide filled HCSFA2—0.5 g of HCSFA2 was weighed into a 20 mL vial and dissolved in THF. Thermally exfoliated graphene oxide (made through modified Hummers method) was added and sonicated until dispersed. The same procedure for the CNFox filled HCSFA2 was followed and the resulting solid appeared very similar to the CNFox sample.

EXAMPLE 5

Membrane fabrication—0.1 to 0.3 g of the composite was rolled into a ball then manually pressed into a preheated 1"×1" piece of stainless steel (ss) mesh (thickness=100 μm, hole size=70 μm). The mesh was repeatedly heated (~100-150° C.) and manually pressed with the composite on a flat surface with a flat object to achieve a coherent film in the mesh. The bulk of the composite was then peeled from the mesh with heat to remove the excess, and leave behind the composite filled holes. The composite on the mesh was cut to fit a tube used for SAW and RAID-M detector testing. Another piece of sturdier mesh was placed behind the composite filled mesh to provide additional stability.

Membranes were fabricated with different weight percent CNFox) and fumed silica. It was found that composites with either type of CNFox that had lower than 15 wt % flowed over time. Composites with larger than 20 wt % CNFox were too powdery to fabricate a consistent membrane. As an initial test, the 20 wt % CNFox/HCSFA2 composite was suspended over a pipette tip for 2 weeks at 120° C. which did not result in any observable movement of the polymer. It was observed in trying to thin the composite for use with IMS or SAW detector systems that thinning the neat CNFox/HCSFA2 composite below a thickness of 0.5 mm resulted in failure/cracking. To mitigate this problem, the composite was coated on the surface of a physical support to provide additional structural integrity. The physical support selected in these initial experiments was a stainless steel mesh (ssmesh, thickness=100 μm with 70 μm diameter holes), which was thin enough when filled with composite for comparable dimensions to an IMS membrane.

The fumed silica composite resulted in a sticky translucent solid that was moldable upon handling. Upon heating to 120° C. over a pipette tip, the composite did not move over a 1 week period. The polymer composite changed from a translucent to a white brittle solid over 4-5 days. This was probably due to removal of remaining solvent from the composite. The amount of fumed silica was decreased to a 10 wt % due to the increased surface area of the filler and the brittleness of the resulting polymer composite. The 10 wt % composite was moldable and was suitable for molding onto a ss-mesh like the one used previously for the CNFox/HCSFA2 membrane but without the brittle/opaque problems from the previous sample.

The weights of the various polymer composites in the ss-mesh are listed in the table below. The PDMS and fumed silica/HC had similar weights in the ¼" circular cut out used for testing (0.75 and 0.8 mg) with the HCSFA2 component of the fumed silica being 0.76 mg. The CNFox/HCSFA2 had a larger amount of composite (4.7 mg) with 3.76 mg being HCSFA2 (calculated).

TABLE 1

Weights of composite and polymers in samples used for testing on IMS systems

| Polymer/Composite | Weight of composite in mesh used in testing | Calculated weight of HC in mesh samples |
|---|---|---|
| CNFox/HCSFA2 (20 wt % calculated) | 4.7 mg | 3.76 mg |
| Fumed silica/HCSFA2 (10 wt % calculated) | 0.8 mg | 0.76 mg |
| PDMS with no HCSFA2 | 0.75 mg | 0 mg |
| CNFox/HCFSA2 (15 wt % calculated) | 1.8 mg | 1.53 mg |

EXAMPLE 6

Thermal properties—TGA measurements were conducted with a TA Instruments TA 2950 with typical experiments heating the polymer (10-20 mg) at 20° C./min from room temperature to 800° C. Differential scanning calorimetry (DSC) was used to determine the $T_g$ and $T_m$ for unfilled HCSFA2 which was −8° C. for the $T_g$, and ~130° C. for the $T_m$. The 20 wt % CNFox/HCSFA2 showed two $T_g$'s. The low $T_g$ (5° C.) was probably due to the bulk polymer and polymer interacting loosely with CNFox and the high $T_g$ (57° C.) was due to the strongly bonded HCSFA2 molecules interacting with the CNFox. DSC showed no $T_m$ for any weight percent of the composite.

The fumed silica filled HCSFA2 showed a $T_g$ at 1.90° C. and another $T_g$ at 73.3° C. probably due to the bulk and interacting polymer (respectively) with the fumed silica. There also was a shallow broad $T_m$ observed at 160° C. which was higher than any $T_m$ observed for the neat HCSFA2.

Thermogravimetric analysis showed that the thermal stability of the HCSFA2 did not change when combined with CNFox initially. However upon heating at 120° C. for 2 weeks the thermal stability of the polymer improved by 20° C. It was also determined that the amount of CNFox was 22-25 wt % in all the samples formulated here. The 5% weight loss temperature for HCSFA2 heat treated at 170° C. for 30 min was 260° C. and the composite after heating 2 weeks at 120° C. had a thermal stability of 266° C. compared with 185° C. for the original unheated, unfilled HCSFA2. Fumed silica had a 5% WLT of 140° C. which was slightly lower than that of the CNFox and HCSFA2 with no filler.

Heat hold experiments showed improved thermal stability for all polymers and composites. The thermal stabilities improved from 150-175 to 235-245° C. It is known that heating to 170 for 30 min had only a small effect on the sorbent properties of the polymer.

TABLE 2

Thermal stability of HCSFA2 and Composites

| Polymer composite | Weight % filler | 5% WLT after heat hold (° C.) |
|---|---|---|
| CNFox (20%)/HCSFA2 | 25 | 266 |
| FS (10%)/HCSFA2 | 18 | 243 |
| HCSFA2 (100%) | 0 | 260 |

EXAMPLE 7

Figure 3A:
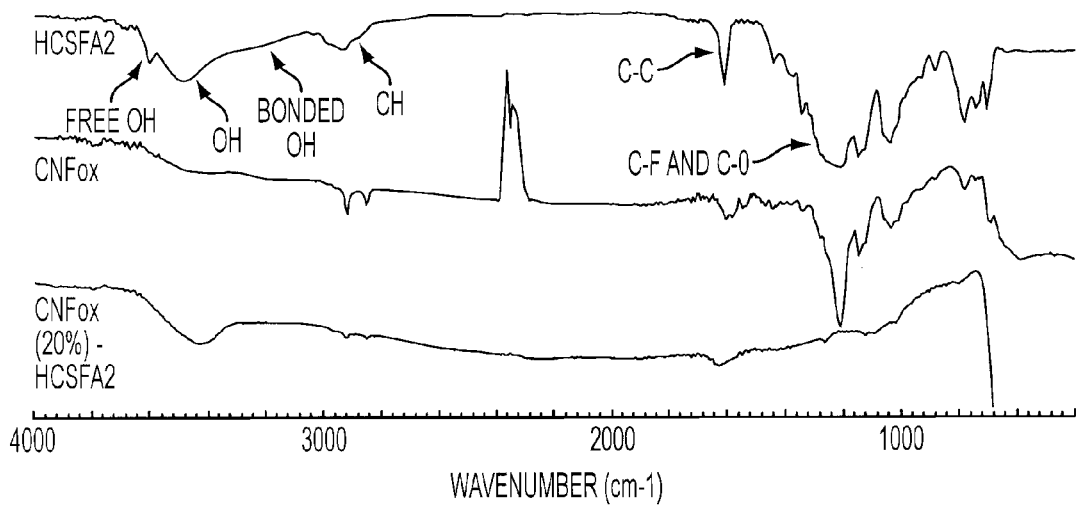
FIG. 3 shows a) FTIR of HCFA2, CNFox (oxidized carbon nanofibers), CNFox (20%)/HCSFA2 composite and b) FTIR of HCSFA2, CNFox, HCSFA2/CNFox (20%), and FS (20%) (Fumed silica)/HCSFA2.
Figure 3B:
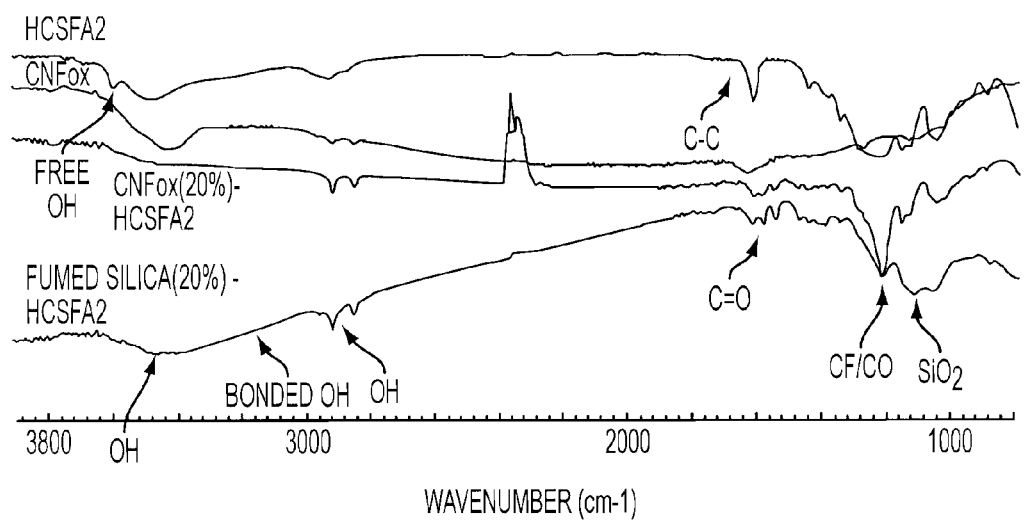

Characterization—FTIR spectra were collected on a Digilab FTS 7000e using KBr salt plates and a liquid $N_2$ cooled MCT detector. FTIR spectra were taken of the HCSFA2 polymer, CNFox, and CNFox/HC composite (FIG. 3). The FTIR of HCSFA2 has peaks at 3050 and 2950 (CH), 1500 (C—C), 1200 (C—O/C—F), and 3400 (OH) $cm^{-1}$. The OH peak for HCSFA2 has its main peak at 3400 $cm^{-1}$ and a small shoulder at 3200 $cm^{-1}$. The small shoulder is the interaction of the polymer with residual solvent and the other OH groups on the polymer chains.

The CNFox shows an OH in a similar position (3400 $cm^{-1}$) to the main OH peak in the neat polymer. The CNFox also shows peaks for aliphatic CH (2900 $cm^{-1}$), and C—C/C=C bonding at 1500 $cm^{-1}$.

The composite (CNFox/HCSFA2) (FIG. 3) had two distinct OH peaks that are approximately 70/30 (3400/3200 $cm^{-1}$) meaning 70% of the OH groups are not interacting (free) and 30% of the OH groups in the composite are interacting. This interaction is stabilizing the polymer by forming physical crosslinks which improved the physical properties including thermal and the mechanical stability. An attempt to subtract the HCSFA2 spectrum from the composite (HCSFA2/CNFox) resulted in inconclusive results due to the OH that was so much larger for the HCSFA2 compared with the composite.

The fumed silica composite resulted in a similar spectrum of that observed for the CNFox composite. There were two OH peaks, although they were not quite as discernable as the CNFox/HCSFA20H peaks. The OH peaks for the FS/HCSFA2 show that there is interaction between the polymer and fumed silica, however the signal is not as great as that for the CNFox spectrum. There were peaks for aliphatic C—H (2950 $cm^{-1}$), C—C (1650 $cm^{-1}$) and C—F/C—O (1200 $cm^{-1}$) which all were in the same position as the peaks in the CNFox/HCSFA2 and HCSFA2 spectra. There also were peaks associated with the $SiO_2$ (1500 and 1000 $cm^{-1}$).

EXAMPLE 8

Sorbing analytes—Inverse gas chromatography (IGC): IGC experiments were performed with an SMS 6890N inverse gas chromatograph at 30° C. with 0.03 p/p° (concentration of analyte/concentration of analyte at saturation), with a non-interacting probe ($CH_4$) used to determine the dead volume. Data was recorded with SMS IGC v1.8 and ChemStation software, and analyzed using Microsoft Excel and SMS IGC software.

IGC was used to examine the surface energies of HCSFA2 polymer and HCSFA2/CNFox composite and determine if the CNFox interaction is causing a significant reduction in the chemical solubility properties of HCSFA2. Acetone was used instead of DMMP being that acetone is a good solubility probe surrogate for DMMP. There was no significant difference in the sorptive abilities of the polymer in the composite compared with the polymer itself. It was expected that the sorptive ability for the polymer may be decreased due to the interaction of the CNFox. This interaction was observed in the FTIR and can take up some HBA sites on the polymer to decrease the sorption of DMMP or other HBB. In this case the polymer had a specific surface energy ($\Delta G_{sp}$) of 22.2 kJ/mol for acetone, and the composite was 22 kJ/mol, meaning that the CNFox did not detract much of the sorptive ability of the polymer.

The fumed silica/HCSFA2 also had similar responses to the various gases compared with the CNFox samples. The FS/HCSFA2 had a specific surface energy for acetone of 20 kJ/mol, compared with 22 kJ/mol for HCSFA2 and HCSFA2/CNFox.

TABLE 3

IGC data for HCSFA2 and composites

| Polymer | Dispersive surface energy ($\gamma$) $mJ/m^2$ | $-\Delta Gsp$ Acetone (kJ/mol) |
|---|---|---|
| HCSFA2 | 34.4 | 22.2 |
| HCSFA2/CNFox 20% | 29.3 | 22 |
| HCSFA2/FS 10% | 37.7 | 20 |
| HCSFA2/CNFox 20% ($HNO_3/H_2SO_4$ 1 h) | 28.5 | 21 |
| FPOL | 36.5 | 13 |
| SXFA | 37.1 | 15 |
| PDMS | 27.0 | 8 |

EXAMPLE 9

Comparative

Synthesis and membrane fabrication for PDMS—Sylgard 184 (Dow Corning) resin and curing agent (in relative amounts given by the manufacturer) were combined in a 20 mL vial and manually stirred 10 min. The air was removed via vacuum. Ssmesh was dipped in the uncured Sylgard 184 and removed. Most of the sylgard was removed by manually wiping the mesh. Mesh/PDMS was cured by heating to 125° C. for 45 min and then cooled to ambient temperature for 2 days in air.

EXAMPLE 10

Figure 4:
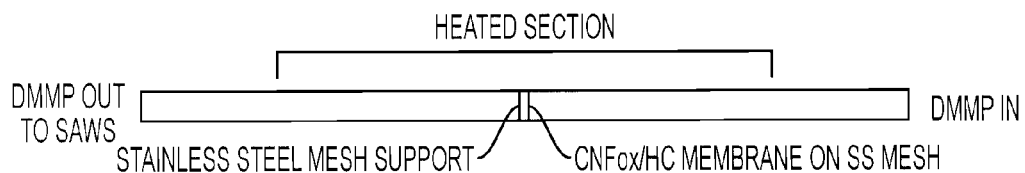
FIG. 4 shows a membrane setup used with the SAW system.

Preliminary testing with SAW system—The membranes (HCSFA2/CNFox and PDMS (Sylgard 184)) were coated on the ssmesh and were cut to the size of a tube used for SAW sensing. The coated and rigid mesh pieces were pushed into a tube like the one depicted in FIG. 4 for testing. It is believed that there were imperfections in the size of the membrane which allowed flow to be turbulent in front of the membrane as the air molecules went around and through the membrane. In this turbulent flow in front of the membrane, the DMMP vapor was sorbed. The thermocouple for detection of the temperature was positioned on the outside of the tubing under the heating elements.

Figure 5:
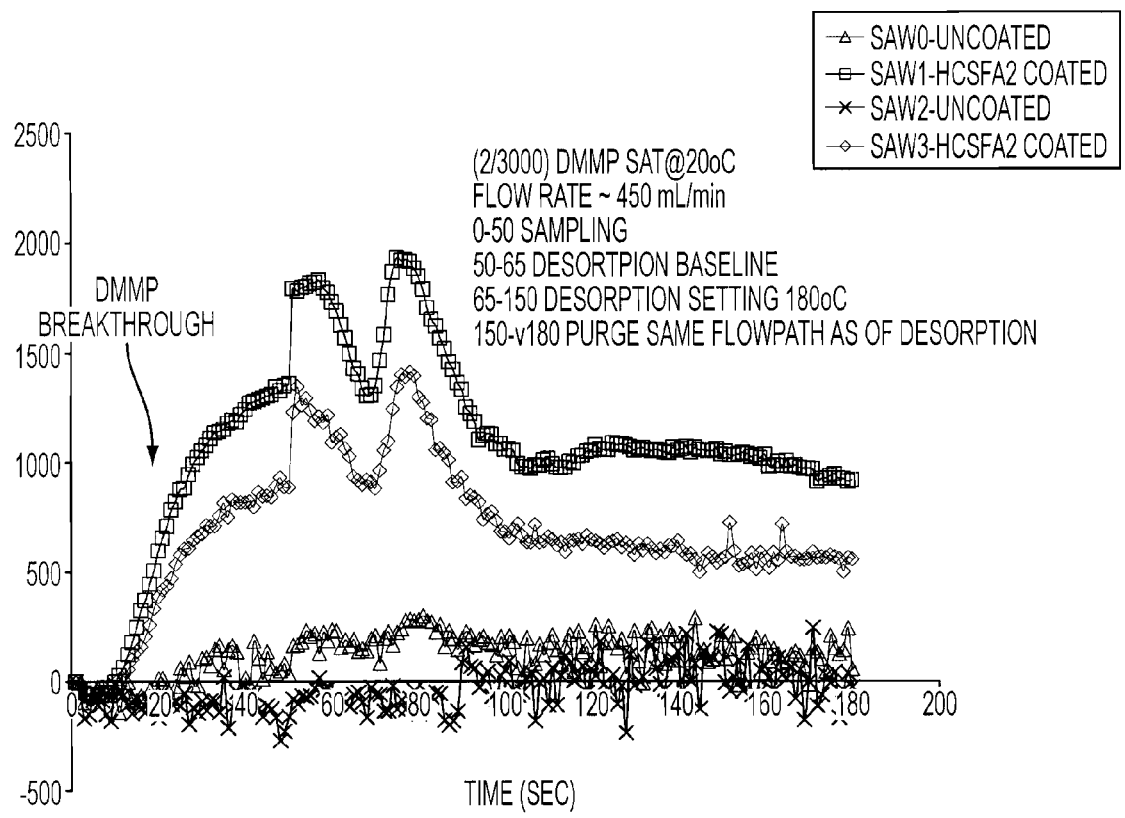
FIG. 5 shows PDMS membrane in front of SAW (surface acoustic wave) system tested with 1 ppm DMMP.

The ssmesh coated polymer composite and PMDS did not have any problems with pressure drop when put into the SAW system. The samples were tested by exposing to DMMP at various concentrations (0-1 ppm) then the membranes were heated to 180° C. to desorb DMMP to the SAWs. It was observed that there was significant DMMP breakthrough for the PDMS sample during sampling (0-50 s). When the air was switched to desorb, the increased humidity and difference in the air caused a jump in the SAWs (50-65 s) and at 65 s the PDMS was heated to 180° C. and a small peak was observed for sorbed DMMP on the PDMS membrane (80 s) (FIG. 5).

Figure 6:
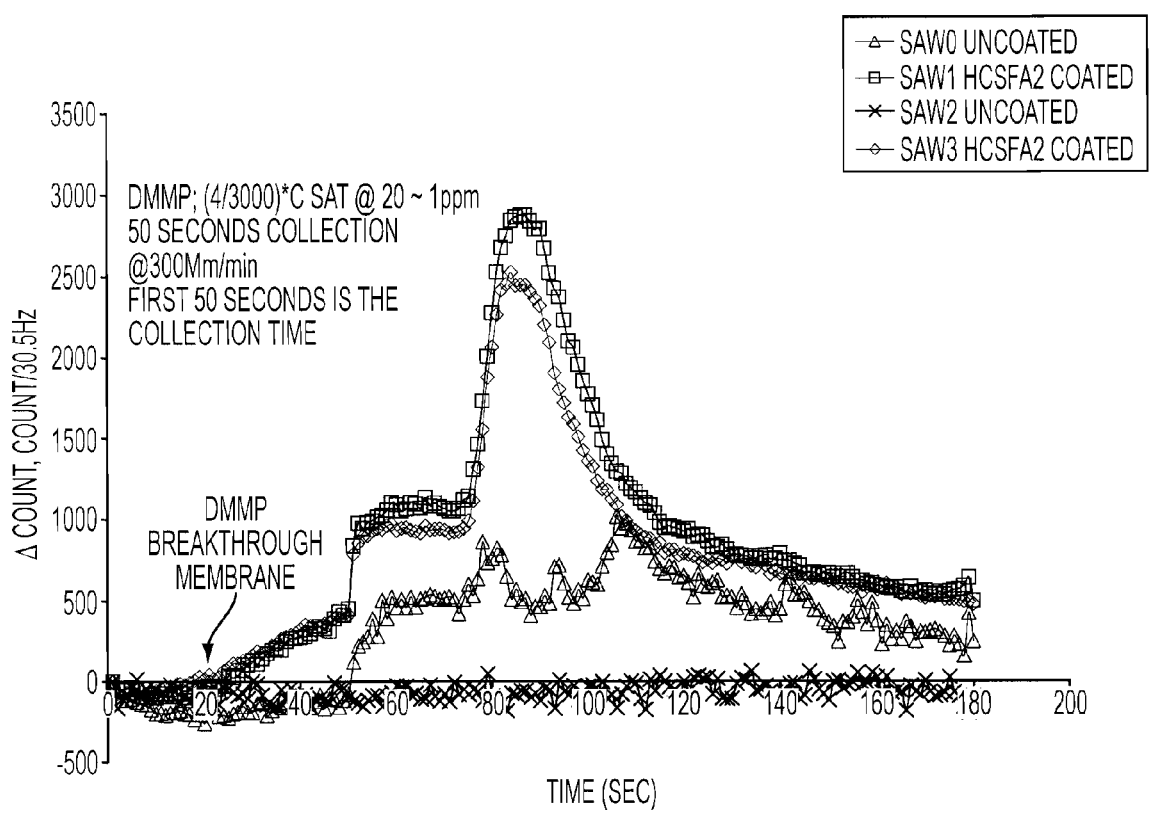
FIG. 6 shows DMMP (dimethylmethyl phosphonate) sorption for HCSFA2/CNFox composite membrane in front of the SAW system.
Figure 7:
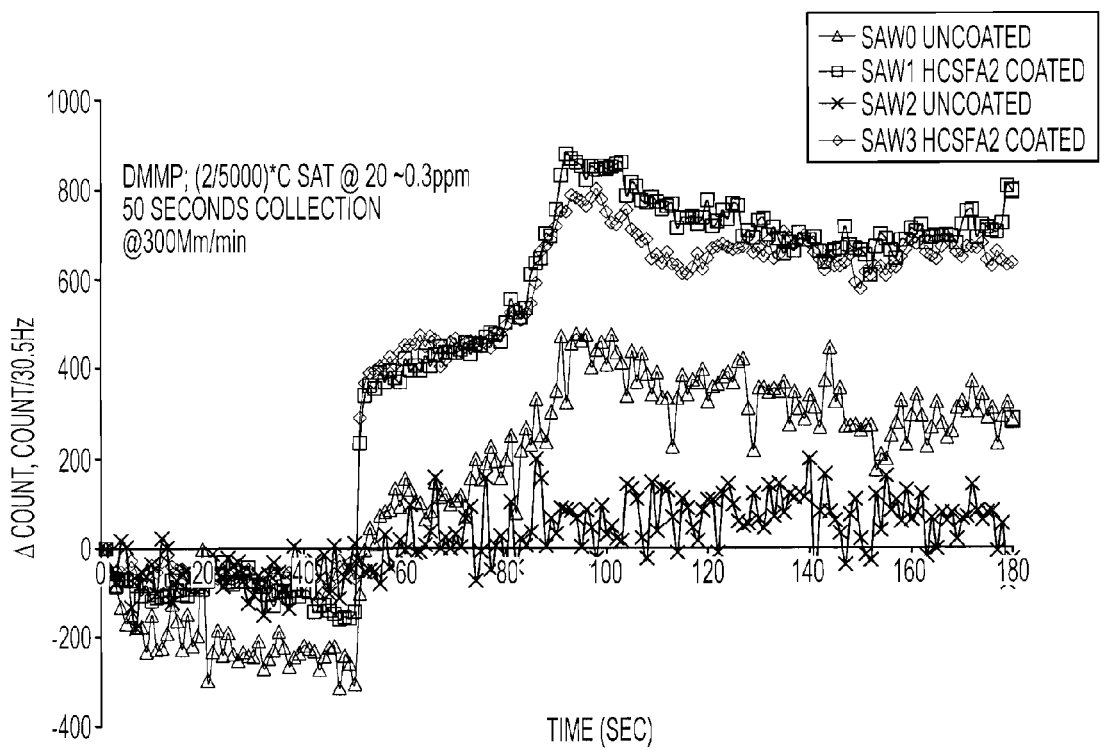
FIG. 7 shows thermal desorption testing of HCSFA2/CNFox composite membrane with no DMMP exposure after the initial DMMP exposure and thermal desorption.

For testing the polymer composite, the experiment was run in the same manner as the PDMS described above; however there was no observed breakthrough until a concentration of 1 ppm (FIG. 6). Even when breakthrough occurred the signal was minimal compared with PDMS. Desorption of DMMP from the functional membrane showed a very large broad peak. This broad peak could be due to inconsistent heating of the mesh, or trapped DMMP vapor from increased viscosity of the polymer. DMMP that was sorbed to the membrane had no problems desorbing. This was supported by collecting data after a second heating cycle which showed a minimal response signal from the SAWs to any DMMP (FIG. 7).

Comparable optical pictures were taken of the polymer composite on the ssmesh before and after heating in the tube as a membrane. Both show essentially the same thing, with polymer/CNFox filling all the holes, and this did not change with heating and testing. There did appear to be some slight movement of the polymer composite to cover more of the metal mesh that was sticking out of the membrane in the pre-heated sample. However this was not sufficient to cause failure of the membrane.

EXAMPLE 11

Testing with RAID-M system—The membranes (on ssmesh) are designed to be operated perpendicular to airflow to force the analytes into the sorbent membrane before passing through for detection. The membranes were heated three different ways, minko heater, heat gun, and nichrome wire resistively heated. Prior to testing membranes on the ss-mesh were conditioned at 177° C. under vacuum for 24 h to drive off all small molecules and oligomers to improve the membrane performance for IMS applications. All membranes were observed to continue to appear uniform with no flow observed from any of the composites. Testing was carried out using a Brüker RAID-M IMS with an inlet that was modified from the original RAID-M. This inlet was fitted with the new membranes in the new nozzle positioned perpendicular to flow. The experiments were conducted as follows: Detector equilibrated for 1 min with air only (flow rate 500-600 mL/min), followed by DMMP exposure at a concentration of 0.01 mg/m$^3$ to 0.05 mg/m$^3$ for 5 min, followed by thermal desorption (minko heater, heat gun, or nichrome wire) for approximately 1 minute and finally a purge for a 20-30 minute time period where the membrane/IMS is allowed to clear down under ambient conditions.

Figure 8:
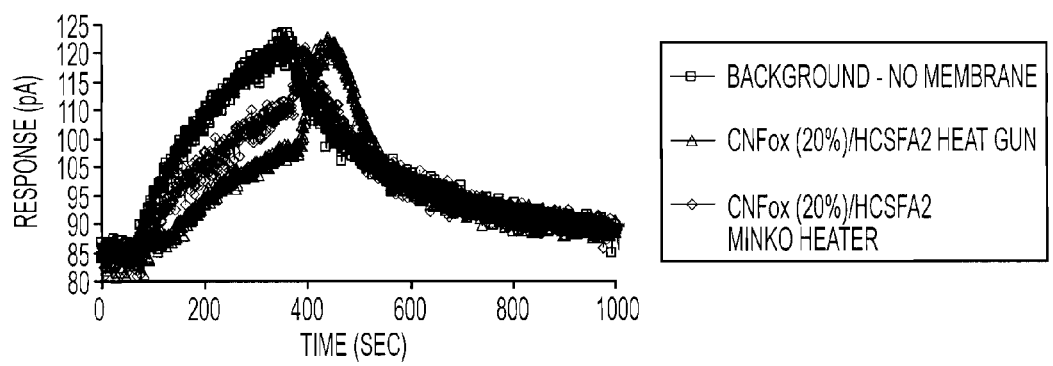
FIG. 8 shows DMMP response with RAID-M (IMS) for HCSFA2/CNFox membrane heated with the minko heater.

It was found that through heating the membrane CNFox/HCSFA2 (ASI oxidized MeOH washed) with different techniques resulted in different results. When the CNFox/HCSFA2 was exposed to DMMP 0.01 mg/m$^3$ (~1 ppb) for 5 min with a flow rate of ~600 mL/min a detector signal drift up was observed due to DMMP going through/around the membrane. When heated to 100° C. with the Minko heater the membrane released the DMMP vapor and a small peak with a height of 10 pA of sorption at the top of the breakthrough peak (360-420 sec) (FIG. 8).

A different membrane cut from the same piece of mesh was inserted into another nozzle with no heater on the outside. The membrane was tested at the same concentration 0.01 mg/m$^3$ with the same flow rate. This new membrane provided much greater sorption of DMMP than the previous membrane because it provided an improved seal with a decreased amount of DMMP going through/around the membrane (0-360 s, FIG. 8). When the DMMP was turned off and the membrane was heated (via a heat gun) to 165° C. there was a much sharper and more significant peak observed for the desorption of DMMP (20 pA compared with 10 pA for the original sample heated to 100° C.). (heat gun heated at a rate of 0.9° C./min).

Figure 10:
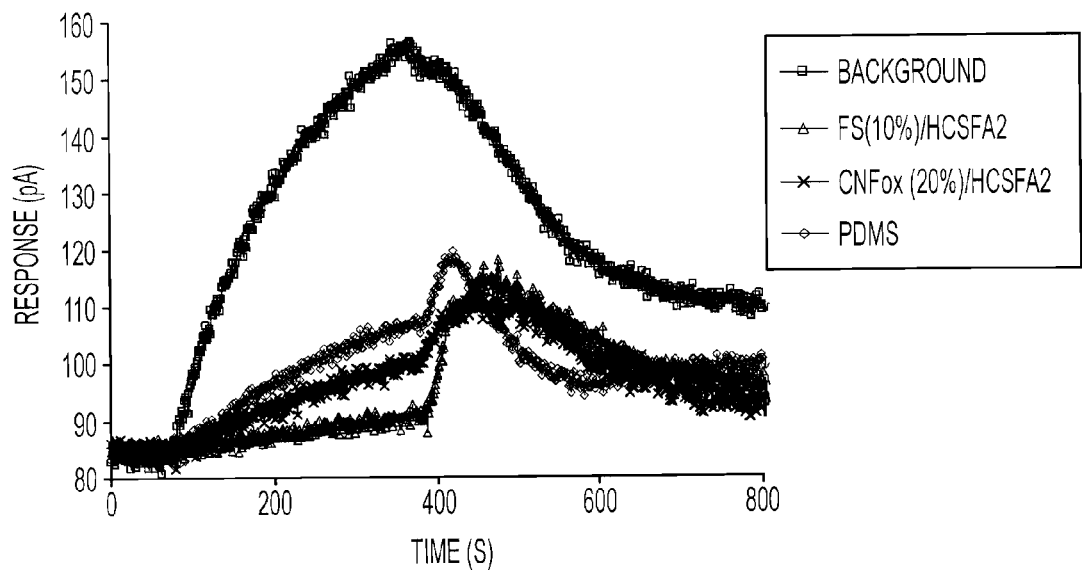
FIG. 10 shows response of membranes on (stainless steel mesh) ss mesh to DMMP at 0.01 mg/m$^3$ heated with heat gun.

Heat gun experiments were expanded to membranes were cut from all the samples including CNFox, fumed silica, PDMS, and mesh with no polymer or filler (FIG. 10). The pieces were positioned in the nozzles and tested with the heat gun similar to the previous test, but heating to 185° C. instead of 165° C. The signal for all these samples were much below that of the baseline with no functional polymer present. This indicated that there may have been flow issues or a contamination issue from which interfered with the NH$_4^+$ ions used as the reactive ion source in the IMS. In spite of contamination/flow issues, the membranes did work as expected in that sorbing DMMP over 5 min resulted in some breakthrough, with PDMS (no HCSFA2) having the highest amount of breakthrough compared with the two HCSFA2 filled samples. The fumed silica sample provided a much higher signal peak when compared with CNFox/HCSFA2 after the DMMP was turned off. CNFox/HCSFA2 exhibited a larger signal than PDMS but less of a signal when compared with fumed silica/HCSFA2. This could be due in part to the CNFox sample having a larger amount of CNFox (15-20%) compared with the fumed silica (10%).

TABLE 4

Peak areas of DMMP sorption for membranes heated with heat gun at 0.01 mg/m$^3$

| Sample | % of Background |
| --- | --- |
| Background | 100 |
| Fumed silica 10%/HCSFA2 | 30.6 |
| CNFox 20%/HCSFA2 | 30.6 |
| PDMS | 36.1 |

Peak areas for this series of experiments did not match the original peak area of DMMP with no polymer/filler (FIG. 10). This could be due to several reasons. 1. The polymer membrane is thick enough to cause a drop in flow rate which allows more DMMP to pass by in the delivery instead of being forced through the polymer. 2. There is lower RIP because of contaminants coming off of HCSFA2 membranes. 3. DMMP could be trapped in the polymer due to the higher viscosity because of the filler binding the polymer together.

Membrane holders were made from metal pieces and nichrome wire heaters. One had an internal heater, based inside the housing or an external heater. Cleaning procedures for both membrane holders involved heating at 130° C. for 3 days after rinsing twice with toluene, CHCl$_3$, and THF. New functional membranes were conditioned 1 week at 130° C. and 145° C. 2-3 days to find the balance between sorption and decomposition. Too much heat for too long decomposed the polymer before it was able to sorb the analyte of interest and defunctionalize the polymer.

Figure 9:
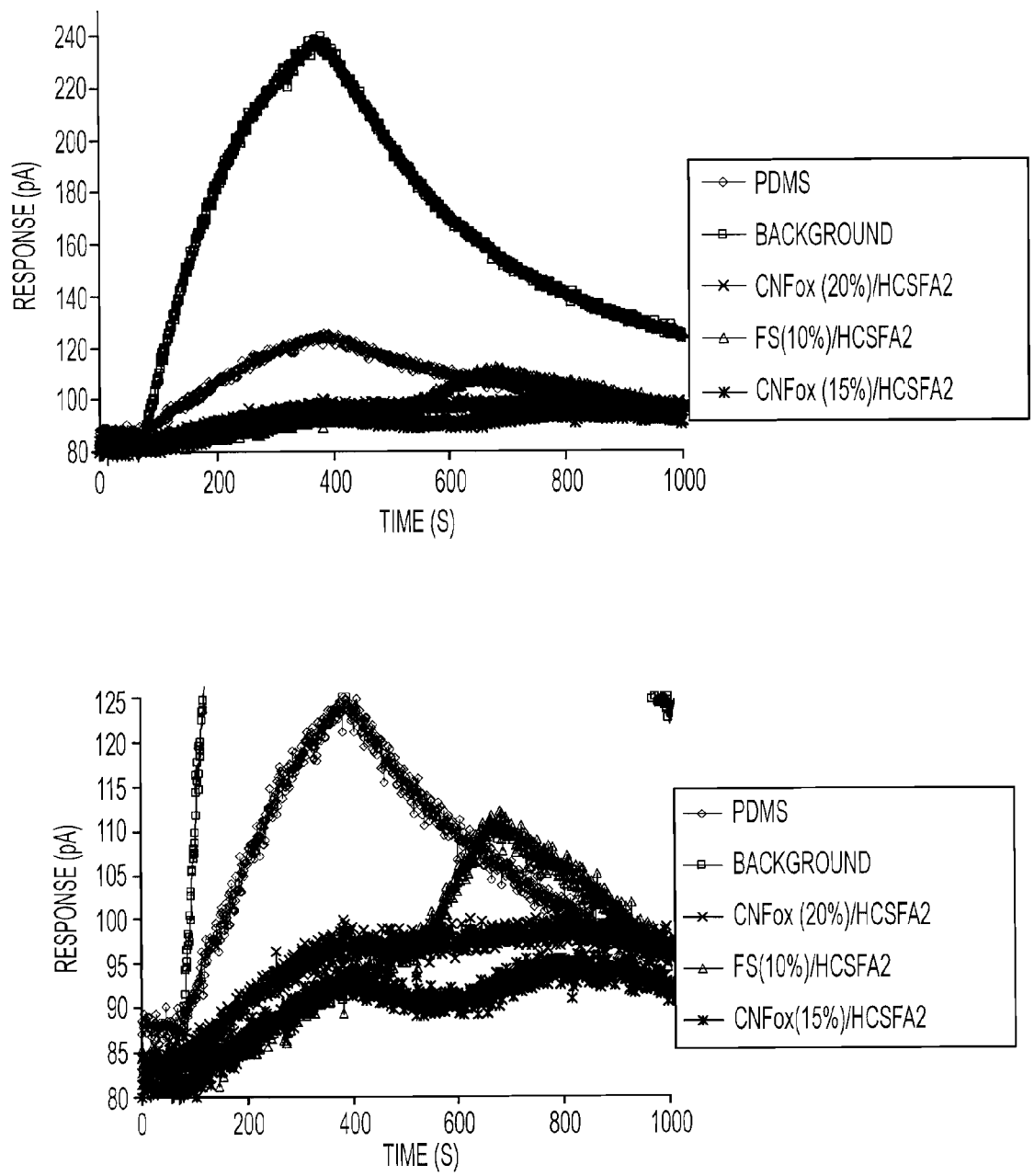
FIG. 9 shows DMMP desorption for HCSFA2 composites resistively heated with a nichrome wire. The top figure is zoom out of bottom figure to observe background and PDMS spectra.

The internally heated membrane apparatus was designed to allow the heat from the nichrome wires to be channeled to the polymer by putting the heater closer to the membrane. The membrane sits inside the holder on an o-ring and the heater is pushed directly against the membrane. After cleaning this holder with toluene, methanol, and THF the apparatus was tested on the RAID-M and the signal noise was improved. The holder was annealed at 150° C. for 2 days then retested, when the RIP was observed to be 1000. Testing involved using a concentration of 0.05 mg/m$^3$ DMMP and heating to desorb anything on the holder with a voltage and current of 1.5 V and 2.5 amp. The membranes (new pieces of same sample) were conditioned for a total of a week before there was low enough noise to do the experiments. The heater with this voltage/current is only able to heat at about 0.1° C./sec to 60-70° C. followed by a jump to 150° C. in 2 s. The results of the DMMP desorption are in FIG. 9 and the polymer membranes were exposed to 0.05 mg/m$^3$ DMMP to get a large enough signal to observe desorption. The figure on the bottom is a zoomed in figure of the one at the top. Desorption of the DMMP was observed around 600-800 s. The reason there is a lag between turn off of the DMMP and desorption is due to the slow heating of the polymer membrane by the internal heater.

It was observed that there was a desorption for the functional membranes but no desorption for the background or PDMS samples. Out of the functional membranes the fumed silica had the largest response followed by the CNFox 15% and finally CNFox 20%. All of the filled membranes had significant improvement over the PDMS membrane. This could be due to the larger amount of HCSFA2 in the fumed silica and CNFox 15% compared with the CNFox 20%. The polymeric membranes again have drastic differences in the peak areas when comparing the polymer with the background for the same reasons mentioned above for the heat gun experiments (FIG. 10).

TABLE 5

Peak areas for RAID-M testing with internally heated membrane setup

| Sample | % of background |
|---|---|
| Background | 100 |
| PDMS | 23.6 |
| CNFox 20%/HCSFA2 | 7.2 |
| Fumed silica 10%/HCSFA2 | 15.1 |
| CNFox 15%/HCSFA2 | 11.1 |

Figure 11:
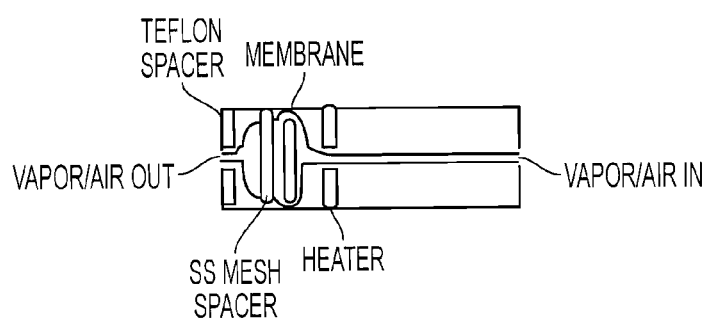
FIG. 11 schematically illustrates a membrane holder with a nichrome wire heater.

The internal membrane of the RAID-M slows the diffusion of DMMP from the functional membrane to the IMS. This was alleviated by remaking the membrane holder (FIG. 11) to allow flow around the membrane and attaching it to the Proengin AP4C to alleviate problems with high pressure drop.

Figure 12:
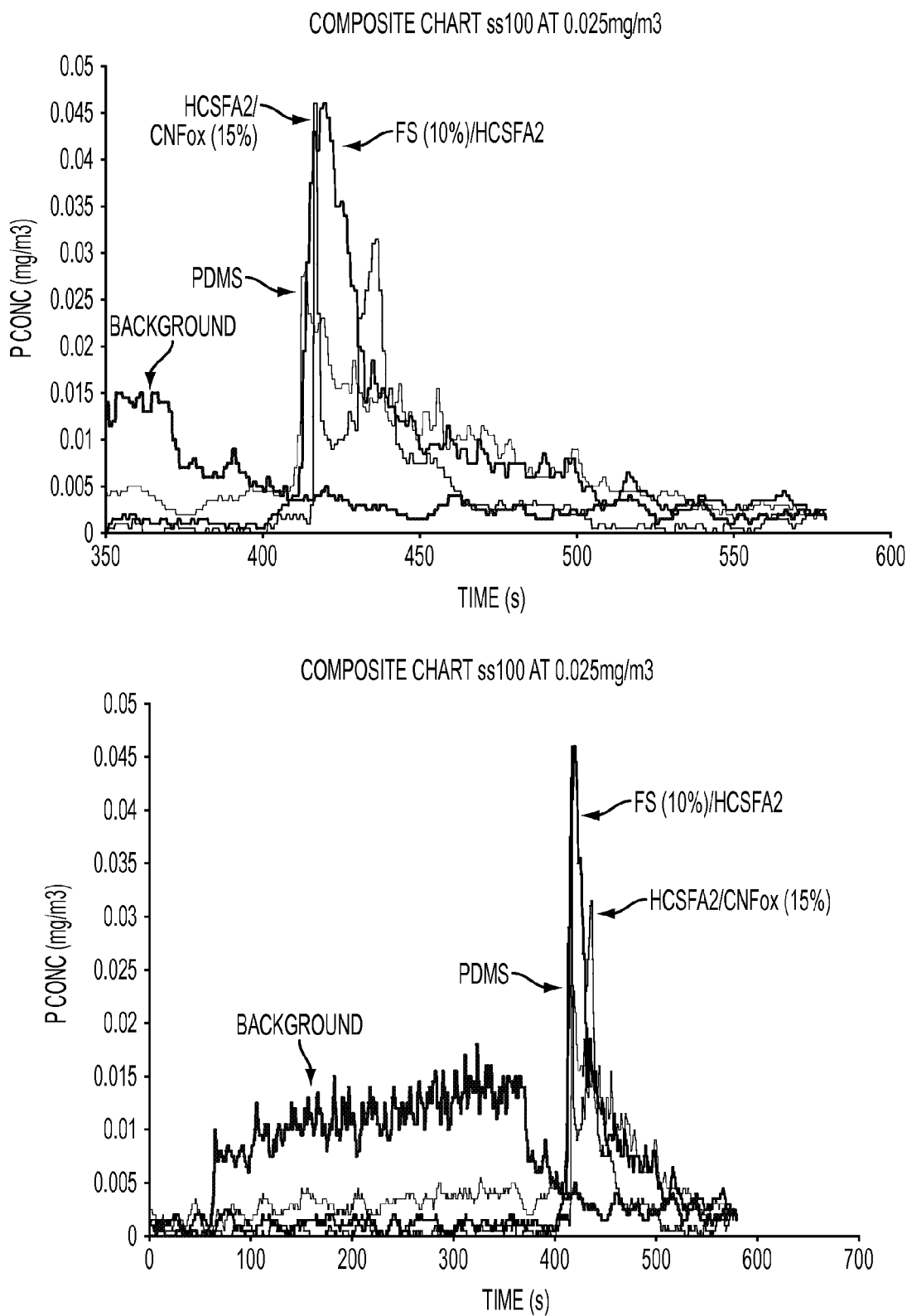
FIG. 12 shows stainless steel (top) and aluminum mesh (bottom) tests with an AP4C flame photometric detector and DMMP (0.025 mg/m$^3$) heated with heat gun.

The mesh used in this case was stainless steel with 100 wires per inch (254 μm holes, 210 μm thick). Testing resulted in the graphs in FIG. 12. The experiment consisted of having DMMP off 60 s, sorbing DMMP (0.025 mg/m$^3$) 300 s, followed immediately by heating to 100-150° C. The heating rate for the internally heated nichrome wire heater was 0.7° C./s from ambient to 60° C. followed by a 2 s heat from 60-150° C. FS/HCSFA2 had a large single peak for phosphorous concentration resulting from the desorption of DMMP from HCSFA2. The CNFox/HCSFA2 also had a significant peak (both being much larger than PDMS). Below are tables of data for the peak areas of the polymer samples on the ssmesh (Table 6). The peak areas for the ssmesh appeared to be closer to equal compared with the aluminum or the ssmesh used with the RAID-M

TABLE 6

SSmesh peak areas

| Sample | % of background |
|---|---|
| Background | 100 |
| PDMS | 62 |
| FS 10%/HCSFA2 | 49 |
| CNFox 15%/HCSFA2 | 25 |

EXAMPLE 12

Testing with microfabricated hotplate (instead of nichrome or heat gun) with the RAID-M for more controlled heating was performed. Microfabricated hotplate (MFH)— The microfabricated hotplate is a planar design consisting of two platinum heater traces laid out in a serpentine fashion on a polyimide coated silicon chip. The hotplates used for CNFox and graphene composite testing have an extra layer of polyimide on top of the Pt trace to prevent shorting (Martin et al., "Microfabricated vapor preconcentrator for portable ion mobility spectroscopy" *Sens. Act. B*, 1217 (2007) 447-454; Pai et al., "Towards enhanced detection of chemical agents: Design and development of a microfabricated preconcentrator" Proceedings of the 14$^{th}$ International Conference on Solid-State Sensors, Actuators, and Microsystems, Lyon, France, Jun. 10-14, 2007, 2291-2294).

1-3 mg of the composite was coated evenly on the surface of the MFH. The composite was heated as it was coated to decrease the viscosity to allow for manual smoothing of the composite on the surface. The composite coated MFH was placed in an oven at 110° C. for 24 h to allow evaporation of any remaining volatiles.

Figure 14:
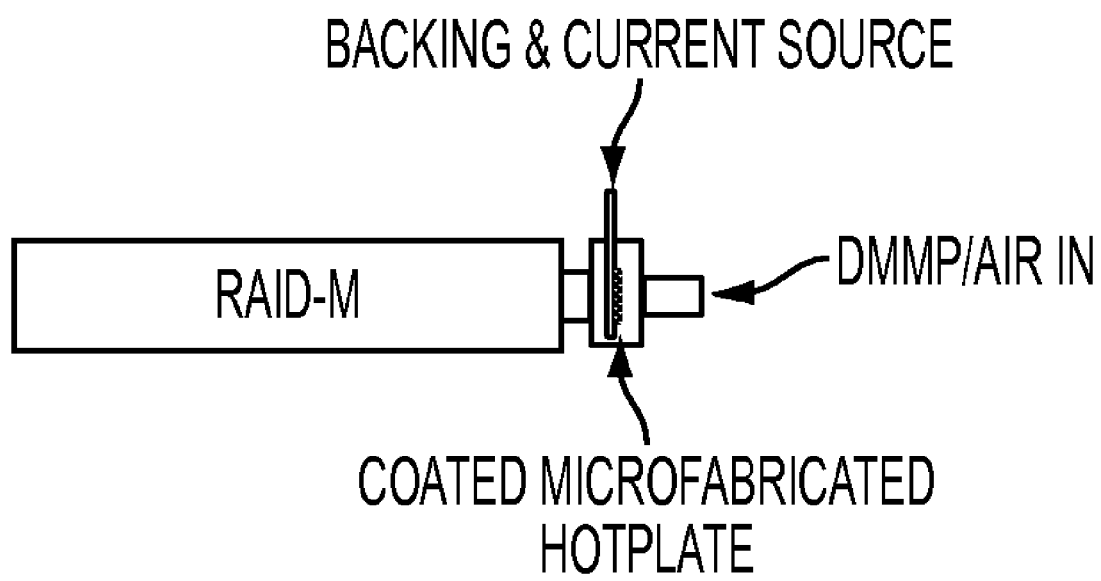
FIG. 14 shows the RAID-M setup with the modified microfabricated hotplate.

The testing used an uncoated MFH or functional membrane coated MFH. The conditioned composite HCSFA2 and PDMS membranes were placed in the membrane holder and purged with clean air for 5 min. (FIG. 14) The experimental test consisted of exposing coated MFH to clean air for 1 min, followed by DMMP for 5 min, and then thermally desorbing at 150° C. for 1500 thermal cycles (~30 s) (600 mL/min; DMMP 0.05 mg/m$^3$ calculated, room temperature, 0% RH).

It was determined that typical thickness measurements (profilometry, SEM, AFM) would be detrimental to the MFH and/or the coating so instead the weight per unit area was determined. The weight/area for each sample was determined after drying at reduced pressure for 24 h at 110° C. and results are shown in Table 7. Error was associated with manual coating, and attempts were made to make all the membrane coatings equal, however before the samples were dried the only measurement available was visual inspection.

TABLE 7

Weight/unit area for the filled and unfilled polymer samples

| Polymer system | Weight total per unit area (μg/mm$^2$) | Weight of HCSFA2 on MFH per unit area (μg/mm$^2$) |
|---|---|---|
| PDMS | 49 | 0 |
| FS (10%)/HCSFA2 | 63 | 53 |
| CNFox (20%)/HCSFA2 | 44 | 32 |
| Graphene oxide (25%)/HCSFA2 | 75 | 66 |
| HCSFA2 (no filler) | 33 | 33 |

The limit of detection was determined to be 0.005 mg/m$^3$ DMMP for 60 s sorption. However it was decided to increase the concentration to better discern the differences in the polymer samples. The DMMP sorption at 0.05 mg/m$^3$ (calculated) was done at room temperature with the results plotted in FIG.

Figure 13A:
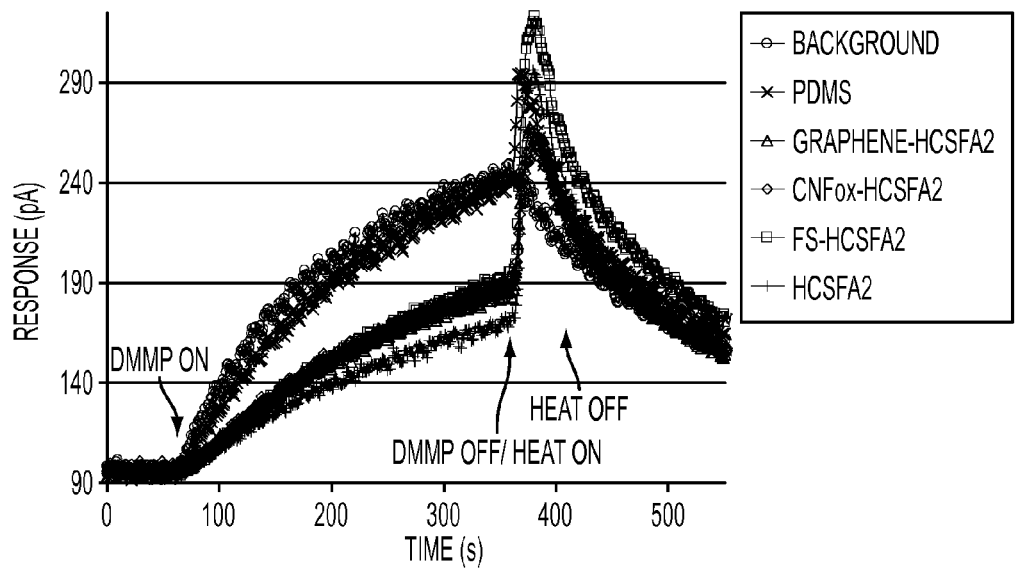
FIG. 13 shows the DMMP response of a RAID-M detector over full 5 min (a), and for the desorption peak only (b) that was coated on a microfabricated heater.

13. FIG. 13*a* shows the plot of the side view of the DMMP peak from the IMS detector. The experiment incorporated DMMP off for 60 s to establish a baseline (0-60 s), followed by 5 min of DMMP exposure (0.05 mg/m$^3$) (60-360 s) and then heating the MFH to a target of 150° C. (360-390 s) and allowing the IMS to return to a normal baseline (390-600 s). There was a significant improvement (at least 2.5 times) in the sorption of DMMP into the polymer composite compared with PDMS.

The difference over the 5 min exposure to DMMP (60-360 s) between the polymer samples and the background is due to the polymer sorbing the height difference. The goal is that the polymer when heated will have a peak that when added to the entire exposure time for that polymer should equal the background, so the peak areas should all be equal. For PDMS this appears to be the case with no discernable difference between the peak area for the background (100%) and the PDMS (99%) relative to the background. PDMS also desorbed DMMP fully when heated once to 150° C. The FS/HCSFA2 had a peak area of 83% of the background and the carbon filled HCSFA2 samples both had peak areas of 72% compared with the background which is attributed to the polymer retaining the remaining DMMP. Due to the increased viscosity and the possibility that DMMP diffused to the bulk of the polymer the DMMP may not be able to escape the polymer during the ~30 s of heating. This was confirmed by heating MFH several times to desorb the remaining DMMP. The shape and surface area of the filler also may play a role in the desorption rate with the rods (CNFox) and plates (graphene oxide) having a more difficult time allowing DMMP to escape compared with spheres (FS).

A sample of HCSFA2 (no filler) was coated in the same manner as the composites which was possible because the polymer is coated on a MFH instead of being required to be free standing in a metal mesh or other substrate. The purpose of testing HCSFA2 (no filler) was to determine if there was any enhancement or decrease in signal of DMMP sorption for the composites compared with the original HCSFA2. The amount of DMMP sorbed between 60 and 360 s was slightly more for HCSFA2 unfilled than the filled polymer samples (FIG. 13*a*). The fillers in the composite HCSFA2 take up some of the sites used by the polymer to sorb HBB analytes, however at these filler concentrations it appears that does not have an effect based on the peak shape and areas.

Figure 13B:
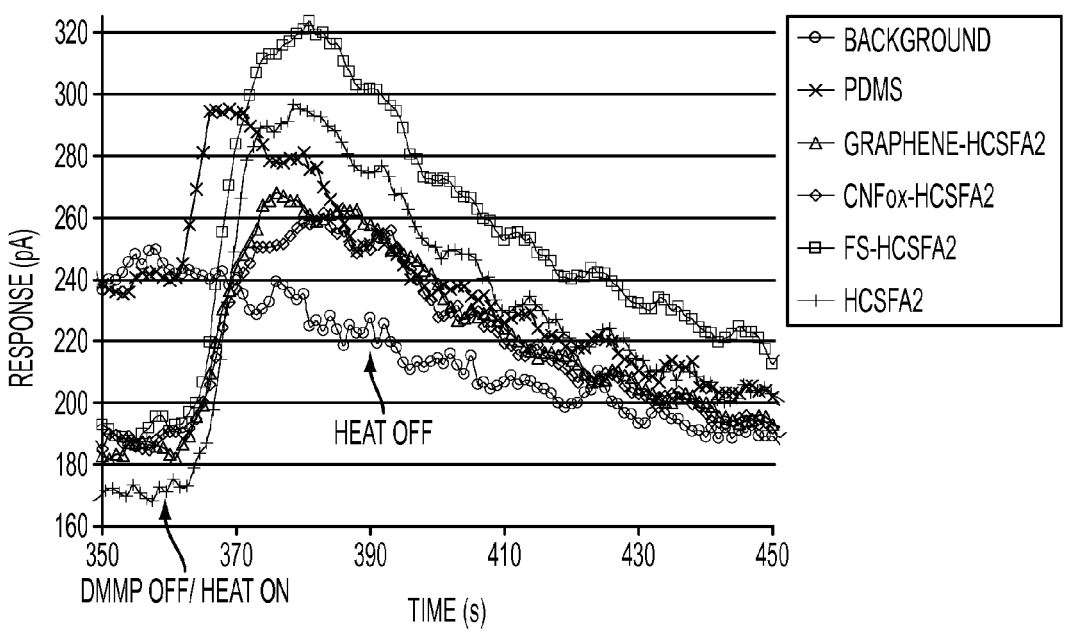

It was found that taking the area of the desorption peak only (FIG. 13*b*) it was possible to determine relatively how much DMMP was desorbed by each sample. These experiments were analyzed relative to unfilled HCSFA2 (100%). The FS/HCSFA2 sample had a peak area of 98%, Graphene oxide/HCSFA2 was 60%, CNFox/HCSFA2 was 48%, and PDMS was 17%. FS/HCSFA2 desorbed more DMMP and acted more like HCSFA2 possibly due to the lower amount of filler required to make the polymer mechanically robust and/or the spherical particles increasing the surface area of the polymer on the MFH. PDMS desorbing 17% compared with the HCSFA2 peak proves that there was 6 times the amount of desorption for the HCSFA2 and HCSFA2/FS compared with PDMS which is used in typical IMS/analytical systems today.

Temperature profiles for the different samples are shown in Table 8. The target temperature for all the samples was 150° C., and the chips heated to an actual temperature of 135-147° C. The temperature rates with the initial rise to the maximum temperature were between 14-22° C./s. Typically the rapid rise took ~5-10 s with the rest of the time maintaining a high temperature to desorb DMMP from the polymer. It was found that out of the HCSFA2 coated MFHs the fastest heating was 20° C./s for HCSFA2 unfilled and the slowest was graphene oxide/HCSFA2 at 14° C./s. The viscosity, amount, and thermal conductivity of the filler likely played a role in how quickly these polymers on the MFH were able to heat. The initial desorption peak onset occurred when the MFHs reached ~100° C. This is the temperature at which the peak was observed to increase (~365 s) in FIG. 13*b*. All of these heating rates are significantly higher and more controlled compared with the heat gun, nichrome wire, or minko heater used previously.

TABLE 8

Temperature data for the MFH heated samples

| Polymer | Heating rate (° C./s) | Maximum Temperature (° C.) |
| --- | --- | --- |
| HCSFA2 (no filler) | 20 | 144 |
| CNFox (20%)/HCSFA2 | 17 | 141 |
| Graphene oxide (25%)/HCSFA2 | 14 | 136 |
| FS (10%)/HCSFA2 | 19 | 147 |
| Background | 22 | 146 |

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A composition comprising:
   a polymer comprising a carbosilane or siloxane backbone and pendant hydrogen-bond acidic groups; and a filler material comprising polar groups;
   wherein the polymer is not covalently bound to the filler material.

2. The composition of claim 1, wherein the pendant hydrogen-bond acidic groups are hexafluoroisopropanol groups.

3. The composition of claim 1, wherein the pendant hydrogen-bond acidic pendant groups are fluorinated phenolic groups.

4. The composition of claim 1, wherein the composition comprises no more than about 25 wt % of the filler.

5. The composition of claim 1;
   wherein the polymer is R'$_3$Si—(CH$_2$—SiR$_2$)$_n$—CH$_2$—SiR'$_3$;
   wherein n is a positive integer;
   wherein each R' is —CH=CH—CH$_2$—C(CF$_3$)$_2$OH; and
   wherein each R is R' or

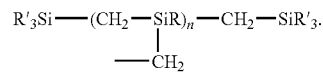

6. The composition of claim 1, wherein the filler is a nanostructured carbonaceous material.

7. The composition of claim 1, wherein the filler is oxidized carbon nanofibers.

8. The composition of claim 1, wherein the filler is oxidized carbon nanotubes.

9. The composition of claim 1, wherein the filler is nanodiamond.

10. The composition of claim 1, wherein the filler is silica.

11. The composition of claim 1, wherein the filler is graphene oxide.

12. The composition of claim 1, wherein the filler is titanium dioxide.

13. A film comprising the composition of claim 1.

14. The film of claim 13, wherein the film is a mesh-supported membrane.

15. The film of claim 13, wherein the film is on a flat substrate.

16. The film of claim 13, wherein the film is coated on a fiber.

17. The film of claim 10, wherein the film is coated inside a tube.

18. A device comprising: the film of claim 13; and a heater configured to heat the film.

19. A method comprising:
 exposing the film of claim 13 to a fluid sample suspected of containing an analyte;
 heating the film to produce an analyte vapor; and
 performing an assay on the analyte vapor.

20. The method of claim 19, wherein the fluid sample is gaseous.

21. The method of claim 19, wherein the fluid sample is a liquid and further comprising:
 removing the film from the liquid sample to allow removal of liquid on the surface of the film.

22. The method of claim 19, wherein the assay is ion spectroscopy.

23. The method of claim 19, wherein the assay is gas chromatography.

24. The method of claim 19, wherein the analyte is a chemical agent.

25. The method of claim 19, wherein the analyte is an explosive or narcotic material.

26. The composition of claim 1, wherein the polymer is a carbosilane.

* * * * *